United States Patent [19]
Dotson et al.

[11] Patent Number: 5,522,765
[45] Date of Patent: Jun. 4, 1996

[54] FISH CLEANING DEVICE

[76] Inventors: Don Dotson, 5019 Constitution Ave., Colorado Springs, Colo. 80915; Ian Barker, 567 Newcastle Street, West Perth, Australia, 6005

[21] Appl. No.: 139,922

[22] Filed: Oct. 20, 1993

[51] Int. Cl.$^6$ .................................................. A22C 25/06
[52] U.S. Cl. ........................................ 452/196; 452/194
[58] Field of Search ................................ 452/196, 195, 452/194

[56]     References Cited
U.S. PATENT DOCUMENTS

| | | | |
|---|---|---|---|
| 2,523,736 | 9/1950 | Swetlik | 452/196 |
| 2,756,457 | 7/1956 | Banowetz, Sr. | 452/195 |
| 2,932,849 | 4/1960 | Missman | 452/196 |
| 3,177,523 | 4/1965 | Anderson | 452/195 |
| 3,248,751 | 5/1966 | Wilborn | 452/195 |
| 3,785,008 | 1/1974 | Parker | 452/195 |
| 4,977,644 | 12/1990 | Evans et al. | 452/195 |

*Primary Examiner*—Willis Little
*Attorney, Agent, or Firm*—Nims, Howes, Collison, Hansen & Lackert

[57]     ABSTRACT

The present invention shows a fish cleaning device comprising a cleaning board member with a work surface upon which a fish to be cleaned may be disposed during cleaning. The board is provided with a means to grip the fish during the cleaning operation. A knife slot is also provided to keep a knife in a convenient location for use. In addition, the board is also provided with a knife holder, to store the knife during transportation and storage. The fish cleaning device is also provided with a refuse collection member, which may be mounted and demounted on the cleaning board, and which may have a refuse collection bag attached, into which the refuse of a fish cleaning operation may be conveyed.

7 Claims, 6 Drawing Sheets

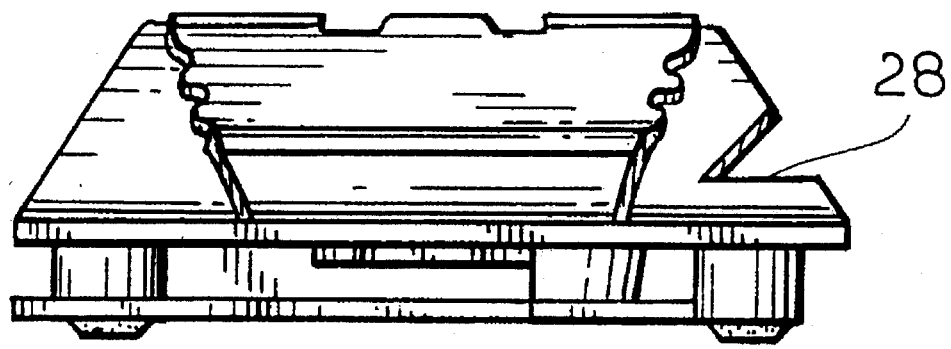
F I G. 4
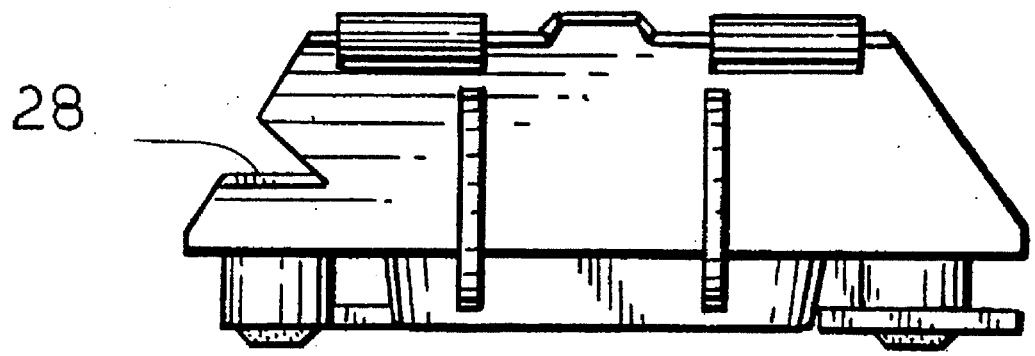
F I G. 5

FISH CLEANING DEVICE

BACKGROUND OF THE INVENTION

1. Field of the Invention

The present invention relates to device useful in the cleaning of fish. In particular, the present invention relates to a fish cleaning device comprising:

a cleaning board member comprising:
  a work surface member, upon which a fish to be cleaned may be disposed during cleaning;
  fish gripping means, cooperating with said work surface, to hold a fish upon said work surface during a cleaning operation;
  a knife slot convenient to said work surface, capable of positively holding a knife in a convenient position for use; and,
  a knife holder convenient to said work surface, capable of positively holding a knife during transportation and storage; and,
a refuse collection member, comprising:
  means for mounting and demounting said refuse collection member relative to said cleaning board member;
  means for mounting and demounting a refuse collection bag relative to said refuse collection member; and,
  an opening through said refuse collection member permitting refuse created in a fish cleaning operation to be conveyed to a refuse collection bag.

2. Description of Related Art

One of the major pastimes in the United States, and around the world, is fishing. Fishing is done in almost every body of water from the smallest irrigation ponds and streams to the largest oceans. It is a leisure time activity enjoyed by people from the very youngest to the very oldest.

One aspect of fishing which is not considered enjoyable, however, is cleaning the fish that are caught to prepare them for cooking. Cleaning and filleting fish is not difficult and, with the right equipment and some practice, it is possible for even an occasional angler to feast on the results of his or her day of fishing. Many of those who fish, however, prefer to release their catch rather than clean and cook them, or give the fish to others, who will do the messy work, and reap the rewards.

A number of specialized tools are available to assist in the work of cleaning a fish. Fish scalers and filleting knives have long been known. Some kind of cutting surface is necessary, but many housewives are reluctant to allow fish to be cleaned on their kitchen counters or cutting boards because of the strong odor left on the board, which can adversely affect other foods. Specialized cutting boards for use with the cleaning of fish have been suggested for a number of years, but many of the boards suggested do not have sufficient utility for this specialized purpose.

SUMMARY OF THE INVENTION

It is an object of the present invention to provide a cleaning board suitable for the particular needs of cleaning fish.

It is a further object of the present invention to provide a cleaning board for the cleaning of fish which will provide a means of collecting the refuse of the fish cleaning operation.

The other objects, features and advantages of the present invention will become more apparent in light of the following detailed description of the preferred embodiment thereof.

According to the preferred embodiment of the present invention, there is provided a fish cleaning device comprising:

a cleaning board member comprising:
  a work surface member, upon which a fish to be cleaned may be disposed during cleaning;
  fish gripping means, cooperating with said work surface, to hold a fish upon said work surface during a cleaning operation;
  a knife slot convenient to said work surface, capable of positively holding a knife in a convenient position for use; and,
  a knife holder convenient to said work surface, capable of positively holding a knife during transportation and storage; and,
a refuse collection member, comprising:
  means for mounting and demounting said refuse collection member relative to said cleaning board member;
  means for mounting and demounting a refuse collection bag relative to said refuse collection member; and,
  an opening through said refuse collection member permitting refuse created in a fish cleaning operation to be conveyed to a refuse collection bag.

BRIEF DESCRIPTION OF THE DRAWINGS

FIG. 4 is an end elevation view of the embodiment of FIG. 1 with the clamping section lowered.

FIG. 5 is an end elevation view of the embodiment of FIG. 1 with the clamping section lowered, taken from the end opposite the view shown in FIG. 4.

DETAILED DESCRIPTION OF THE PREFERRED EMBODIMENT

Figure 1:
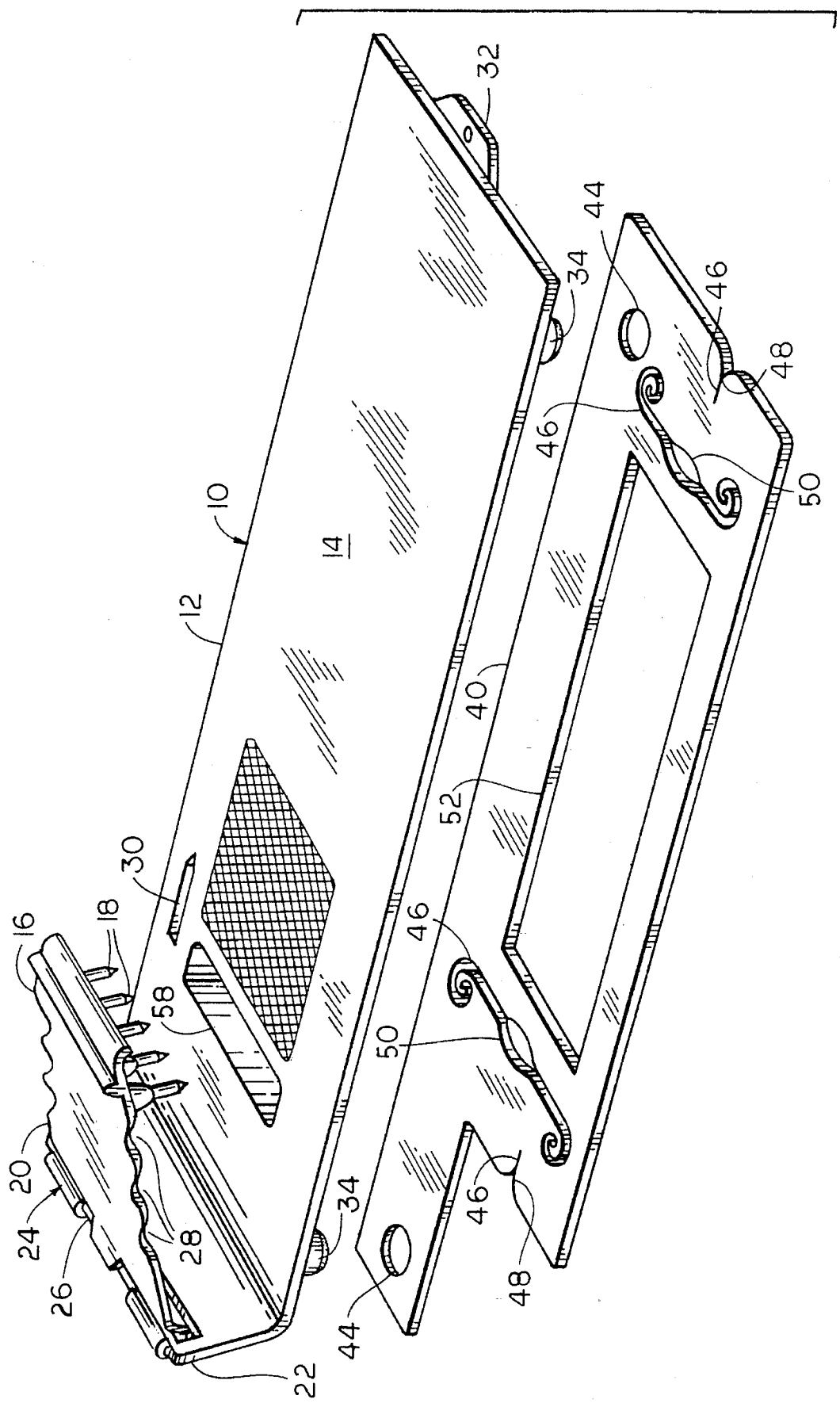
FIG. 1 is a perspective view of the top of the invention embodying the new design, with an attachment, intended to hold a garbage bag, shown alongside.

As seen in the accompanying drawings, FIG. 1 is a perspective view of the top of the invention, with an attachment, intended to hold a garbage bag, shown alongside. The invention comprises a fish cleaning device 10. The device 10 includes, firstly, a cleaning board 12 with a work surface 14, upon which a fish to be cleaned may be disposed during cleaning. The device 10 also includes a means 16 for gripping the fish which, in the illustrated embodiment, is accomplished by the prongs 18 of hinged member 20 cooperatively attached to one end 22 of cleaning board 12.

The fish gripping means 16 and the work surface 14 cooperate to hold a fish in place during a cleaning operation. The fish gripping means 16 is advantageously rotatable attached to the one end 22 of the cleaning board 12. This rotatable attachment may take the form of the integrally-formed hinge members 24 and 26, or a bonded hinge, or even a kerf cut in a continuous piece of material. An opening 58 is provided in work surface 14 to accomodate prongs 18 of gripping means 16, when said gripping means 16 is engaged.

Figure 2A:
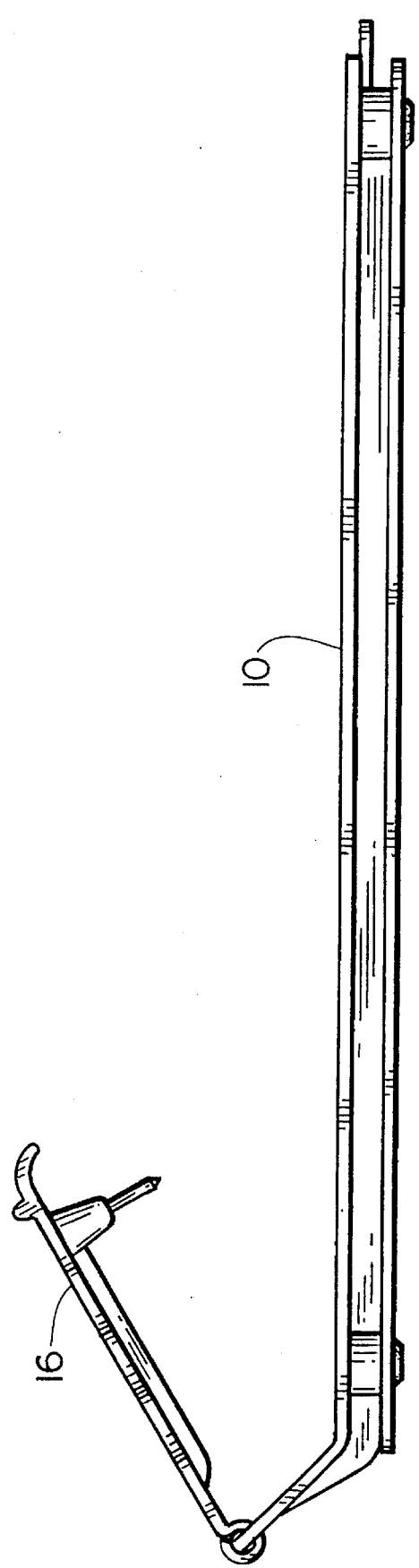
FIG. 2A is a side elevation view of the right side of the embodiment of FIG. 1, with the clamping section raised.

FIG. 2A is a side elevation view of the right side of the embodiment of FIG. 1, with the gripping means raised. This view shows the device 10 with the gripping means 16 in an open position.

Figure 2B:
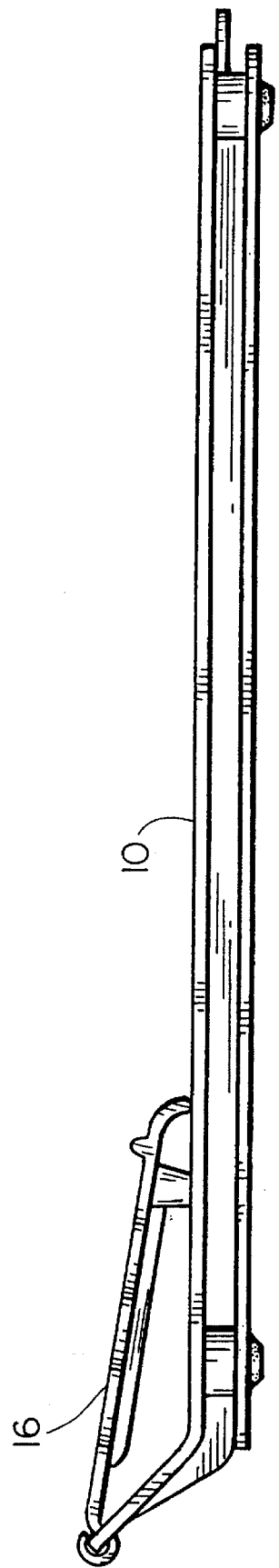
FIG. 2B is a side elevation view of the right side of the embodiment of FIG. 1, with the clamping section lowered.

FIG. 2B is a side elevation view of the right side of the embodiment of FIG. 1, with the gripping means 16 lowered.

Figure 3A:
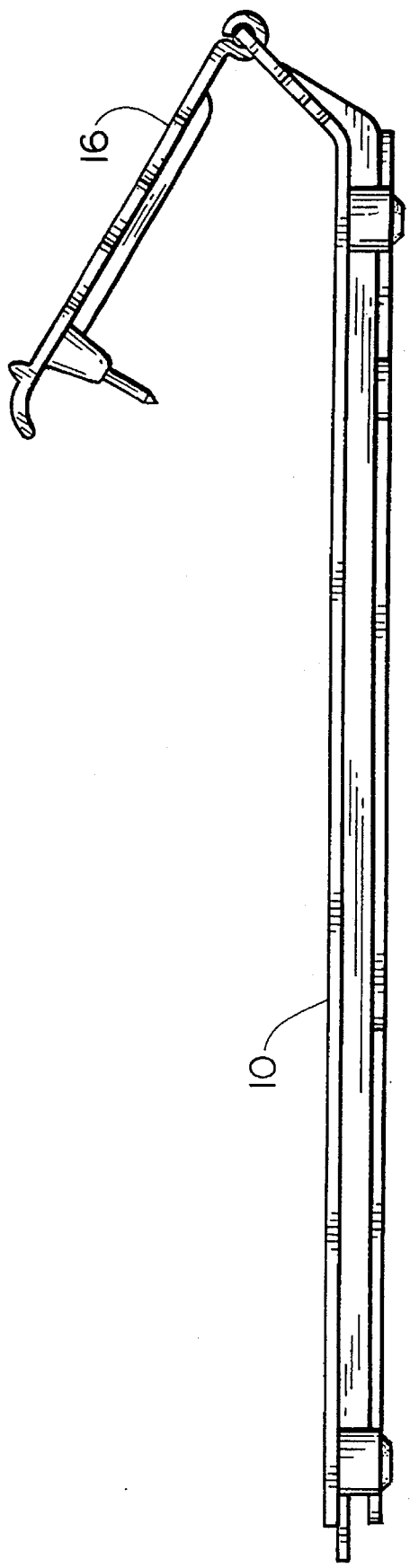
FIG. 3A is a side elevation view of the left side of the embodiment of FIG. 1, with the clamping section raised.

FIG. 3A is a side elevation view of the left side of the embodiment of FIG. 1, with the gripping means raised. This view shows the device 10 with the gripping means 16 in an open position.

Figure 3B:
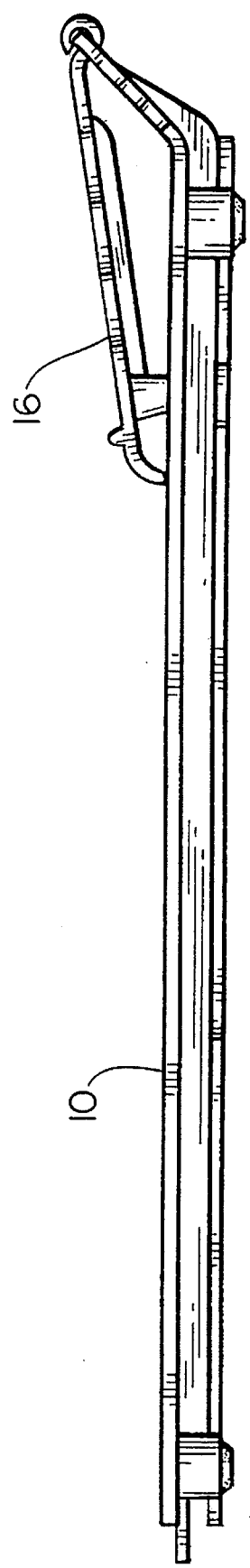
FIG. 3B is a side elevation view of the left side of the embodiment of FIG. 1, with the clamping section lowered.

FIG. 3B is a side elevation view of the left side of the embodiment of FIG. 1, with the gripping means 16 lowered.

FIG. 4 is an end elevation view of the embodiment of FIG. 1 with the clamping section lowered.

FIG. 5 is an end elevation view of the embodiment of FIG. 1 with the clamping section lowered, taken from the end opposite the view shown in FIG. 4.

Again with reference to FIG. 1, it can be seen that in the preferred embodiment, the gripping means 16 is further provided with sculptured edges 28 to better accomodate the fingers of a user.

With continued reference to FIG, 1, there is also shown a knife slot 30, in which a knife used in the cleaning operation can be conveniently held which a portion of the operation which does not require the knife is carried out. The device 10 is also advantageously provided with a knife sharpener 28, which may be located within the knife slot 30, or at a separate, convenient location, as shown in FIGS. 4 and 5.

The cleaning board 12 is also conveniently provided with a hanging means 32 by which the device 10 may be hung up for storage.

Figure 6:
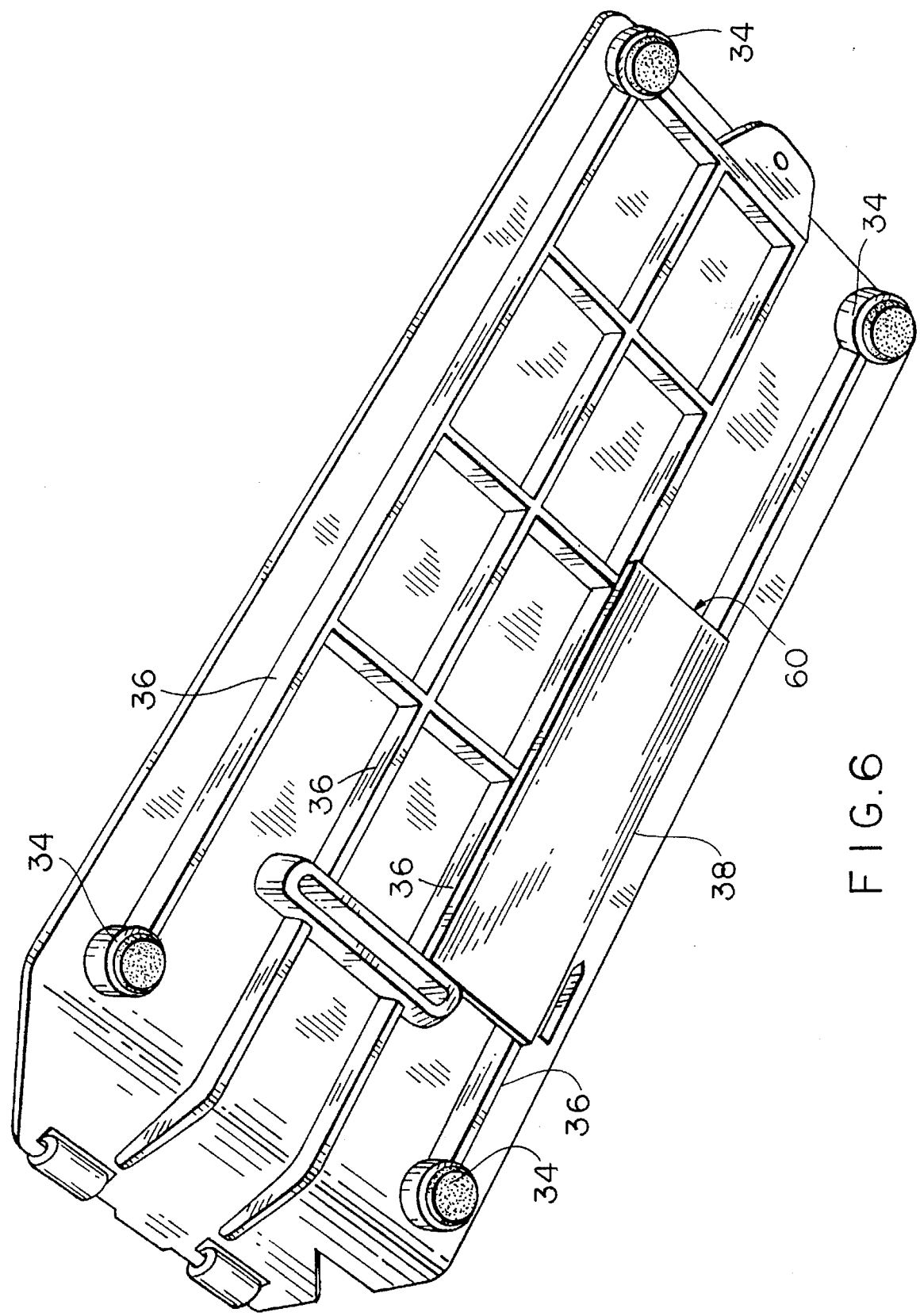
FIG. 6 is a bottom perspective view of the embodiment of FIG. 1.

One of the major difficulties of fish cleaning, as noted previously, is the refuse, and prior art cleaning boards seldom address this need. For this reason, the device 10 of the present invention is provided with a refuse collection member 40. This collection member 40 is provided with means 42 for mounting and demounting said refuse collection member 40 to and from said cleaning board 12. In the preferred embodiment illustrated, said means comprises holes 44 in said collection member 40 which engage legs 34 on the underside of cleaning board 12. Legs 34 can, perhaps be seen more clearly in FIG. 6, which is a bottom perspective view of the embodiment of FIG. 1.

Said refuse collection member 40 is also provided with means 46 for mounting and demounting a refuse collection bag relative to said refuse collection member 40. In the preferred embodiment, said means 46 may comprise the combination of slits 48 and scrolled cut-outs 50, adapted to receive a collection bag. The bags which are envisioned for use with the present invention comprise the small plastic bags commonly used in food and other stores, which are commonly available. Certainly, a supply of suitable bags could be provided with the device or separately.

With the refuse collection member in place attached to the cleaning board 12, and with a suitable collection bag in place, held by the slits 48 and scrolled cut-outs 50, refuse from the work surface 14 of the cleaning board 12 may be deposited in the collection bag through an opening 52 through said refuse collection member 40 permitting refuse created in a fish cleaning operation to be conveyed to a refuse collection bag.

As noted previously, FIG. 6 is a bottom perspective view of the embodiment of FIG. 1. As seen therein, the cleaning board 12 of fish cleaning device 10 is supported by integrally formed ridges 36. A portion of such ridges, however, have been removed in the preferred embodiment, and plate 38 has been affixed to provide a knife holder 60 convenient to said work surface 14, capable of positively holding a knife during transportation and storage.

Figure 7:
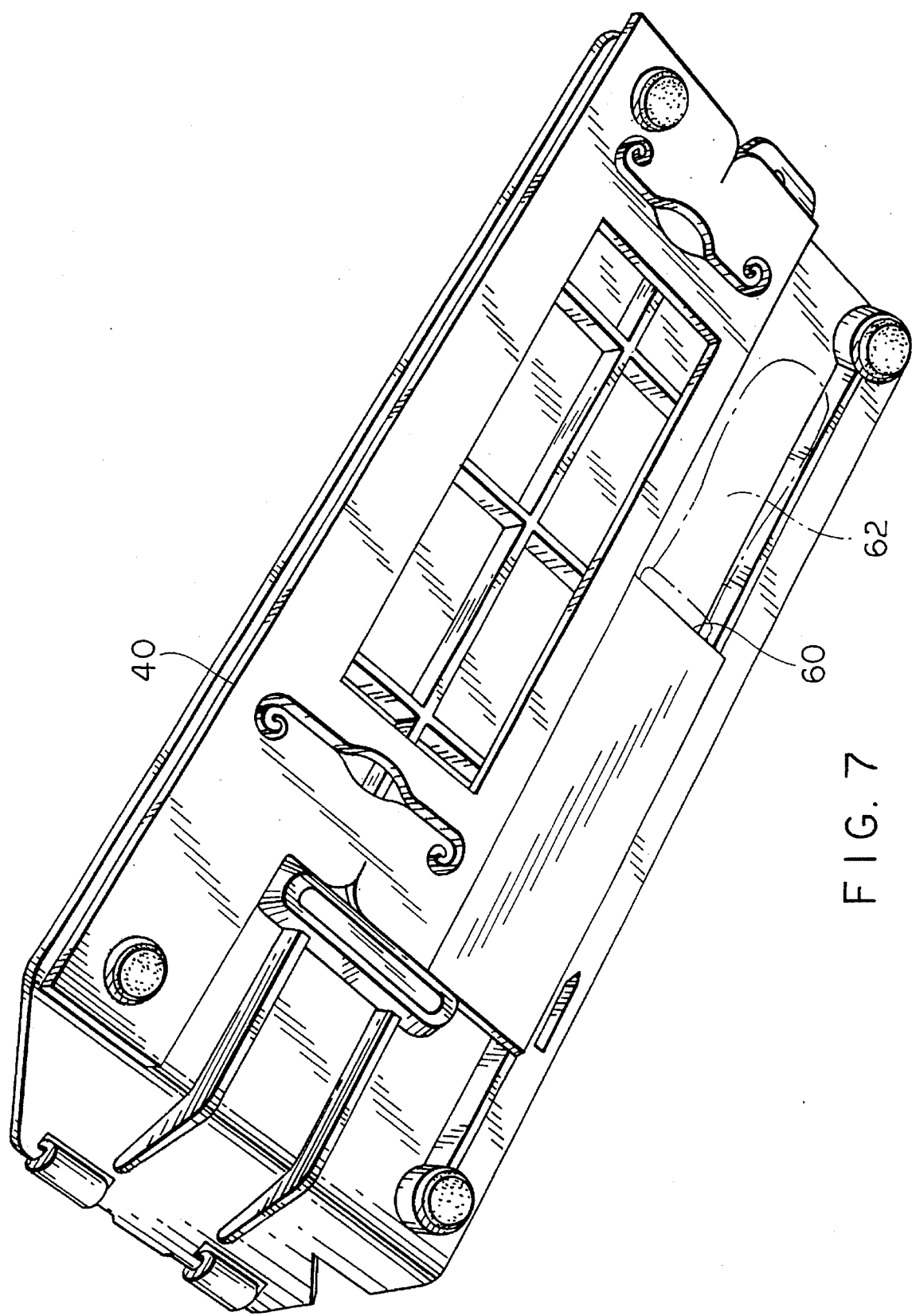
FIG. 7 is a bottom perspective view of the embodiment of FIG. 1, with the garbage bag holder attachment in its storage position, and a knife in the storage position provided therefor.

FIG. 7 is a bottom perspective view of the embodiment of FIG. 1, with said refuse collection member 40 in its storage position, and a knife 62, in the knife holder 60 provided therefor.

Other features, advantages, and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. A fish cleaning device comprising a cleaning board member having a substantially rectangular work surface, upon which a fish to be cleaned may be located during cleaning;

pivotal handle means attached to an end of the cleaning board member and having fish gripping means at the opposite end thereof, the gripping means comprising prongs for passing through the fish, an opening provided in the work surface in alignment with the prongs and through which the prongs may pass, the gripping means provided for holding the fish upon the work surface;

a separable refuse collection member removably attached to the cleaning board member and having means for mounting and demounting to the cleaning board member along a side of the substantially rectangular work surface member, the refuse collection member having an opening therethrough located adjacent to the work surface, the refuse collection member having means for mounting and demounting a refuse collection bag to the refuse collection member beneath the opening to permit refuse created in the fish cleaning operation to be conveyed to the refuse collection bag, the refuse collection member having a pair of shaped openings, and the cleaning board member having at least two complimentary shaped projections extending perpendicularly from a lower surface thereof such that the shaped openings in the refuse collection member are alignable with the shaped projections in the work surface for mounting the collection member thereto.

2. The fish cleaning device of claim 1 further comprising a knife slot in said work surface having a size sufficient to allow partial passage of a blade therethrough for holding a knife in an upright accessible position for use.

3. The fish cleaning device of claim 1 further comprising a knife holder located beneath the work surface for holding a knife during transportation and storage.

4. The fish cleaning device of claim 1 further comprising a knife sharpener.

5. The fish cleaning device of claim 1 wherein the cleaning board member has at least four projections, the refuse collection member being mountable in either a first storage position where the member is entirely disposed beneath the cleaning board member or in a second cleaning position wherein the refuse collection member extends from a side thereof adjacent to the cleaning surface.

6. The fish cleaning device of claim 1 wherein the pivotal handle means has scalloped side edges for forming a hand grip.

7. The fish cleaning device of claim 1 wherein the shaped openings are circular and the complimentary shaped projections are circular.

\* \* \* \* \*